(12) United States Patent
Cole

(10) Patent No.: US 6,304,408 B1
(45) Date of Patent: *Oct. 16, 2001

(54) APPARATUS AND METHOD FOR A REDUCED SEEK-TO-TRACK TIME FUZZY RULE CONTROLLER FOR A HARD DISK DRIVE READ/WRITE HEAD ACTUATOR

(75) Inventor: Charles P. Cole, Richardson, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,076

(22) Filed: Jun. 19, 1997

(51) Int. Cl.[7] ................................. G11B 5/596
(52) U.S. Cl. ...................... 360/77.02; 360/78.04
(58) Field of Search ................ 360/78.05, 78.04, 360/78.06, 75, 77.02, 77.01, 78.09, 61, 77.04; 364/174

(56) References Cited

U.S. PATENT DOCUMENTS

| 5,267,144 | * | 11/1993 | Yoshida et al. | 360/78.04 X |
|---|---|---|---|---|
| 5,270,880 | * | 12/1993 | Ottesen et al. | 360/77.02 X |
| 5,424,886 | * | 6/1995 | Tomitaka | 360/77.01 |
| 5,598,304 | * | 1/1997 | Choi et al. | 360/78.06 X |
| 5,638,230 | * | 6/1997 | Kadlec | 360/78.04 |
| 5,818,651 | * | 10/1998 | Nomura | 360/78.06 |
| 5,847,895 | * | 12/1998 | Romano et al. | 360/78.09 X |

* cited by examiner

Primary Examiner—Andrew L. Sniezek
(74) Attorney, Agent, or Firm—W. James Brady, III; Frederick J. Telecky, Jr.

(57) ABSTRACT

A controller for read/write head actuator of a hard disk drive system includes a feedback unit providing a voltage to a servo-actuator motor. The feedback unit includes a first fuzzy logic rule-based algorithm unit for the seek mode and a second fuzzy rule-based algorithm unit for the track mode. In the seek mode, the first algorithm unit, based on present position and delta (velocity) parameters, determines an optimum velocity. A signal representing the optimum velocity is compared with a signal representing the present velocity and an appropriate signals applied to the head actuator unit. The use of the fuzzy logic rule-based algorithm permits a near-minimum seek time even in the presence of non-linear and varying parameters. The output signal from the seek mode apparatus or the output signal from the track mode apparatus is selected based on position and velocity parameters.

5 Claims, 9 Drawing Sheets

APPARATUS AND METHOD FOR A REDUCED SEEK-TO-TRACK TIME FUZZY RULE CONTROLLER FOR A HARD DISK DRIVE READ/WRITE HEAD ACTUATOR

BACKGROUND OF THE INVENTION

1. Field of the Invention

This invention relates generally to hard disk drive systems and, more particularly, to the control system determining the position of the read/write head over the storage disk. The read/write head is mounted on an arm, the arm in turn is driven by a servo-actuator unit relative to the tracks on the disc. The control system is designed to minimize the time to move the read/write head from an initial position over the tracks of the storage disk to a final position over the tracks of the storage medium, a mode of operation referred to as a "seek" operation.

2. Description of the Related Art

The reduction of the seek time is becoming more difficult as the tracks on the storage disk become more dense. The arm, upon which the read/write head is mounted, and the servo actuator motor (or dc motor) driving the arm are referred to as the hard disk drive "plant". The plant is characterized by electrical and mechanical systems which can be non-linear, which can be unknown, and which can be a function of environmental (and/or time-dependent) parameters. Prior art plant control units which perform the seek function are unable to achieve the minimum seek time within the parameters and constraints of the end point accuracy and settling requirements.

Referring to FIG. 1, a block diagram of a hard disk drive closed-loop plant control unit for a hard disk drive plant, according to the prior art, is shown. Signals representing the desired and the actual position of the read/write head are applied to input terminals of difference amplifier 10. Position loop component 11 receives the output signal from difference amplifier and applies the filtered signal to a first terminal of difference amplifier 12. A second terminal of difference amplifier 12 has a signal representing the read/write head velocity applied thereto. (The head velocity is frequently referred to herein as the head delta position.) The output signal of difference amplifier 12 is applied to an input terminal of velocity loop component 13. The output signal of velocity loop component 13 is applied to a first terminal of difference amplifier 14. A second input terminal of difference amplifier 14 receives a signal representative of the actuator current. The output signal of difference amplifier 14 is applied to current loop component 15. The output signal of current loop component 15 is applied to a power supply saturation analog unit 16. The output signal from analog unit 16 is applied to one input terminal of difference amplifier 17. A second input terminal of difference amplifier 17 receives a signal indicative of induced emf from an output terminal of back-emf component 102. The output signal from difference amplifier 17 is applied to the actuator impedance analog unit 18. The output signal from the analog unit 18 is applied to the second input terminal of difference amplifier 14 and to the torque/inertia analog unit 19. The output signal from analog unit 19 is applied to the second input terminal of difference amplifier 12, to an input terminal of back-emf component 102, and to 1/s component 101.

The output signal of 1/s component 101 is applied to the second terminal of difference amplifier 10 and determines the position of the read/write head. The position is also referred to herein as the actual position or relative position, i.e., measured with respect to the final track position.

Difference amplifier 17, actuator impedance analog unit 18, torque/inertial analog unit 19, 1/s component 101 and back-emf component 102 represent a model of the hard disc drive plant. Actuator impedance unit 18 provides the analog of the actuator unit impedance (resistance and inductance). Torque/inertial analog unit 19 provides the analog of the actuator torque constant ($K_t$), the rotational inertial (J) and the integration (1/s), providing the velocity from the acceleration. 1/s component 101 provides the analog of integration from velocity to position. And back-emf component 102 provides the analog of the back emf constant $K_b$ of the voltage generated by the actuator motor.

Conventional closed-loop controllers typically perform the seek-to-track function by using estimates of the position, velocity and acceleration (plant states) information as feedback information to close the loop. The closed-loop controllers can be implemented using either analog or digital technology. The closed-loop controllers employing the analog technology, attempting to provide a minimum seek time can be complicated by uncontrollable variables such as loop gain variation, power supply variations, and large plant variations. Closed-loop controllers in digital technology provide improved performance through the use of more complex mathematical algorithms to compensate for offset and to compensate for some loop parameter variations. Closed-loop analog controllers of the prior art provide an average seek time of approximately 15 milliseconds (msec). Using digital technology, this seek time can be reduced to a range of between 10 and 12 msec. It is anticipated that future requirements, derived from the need for higher positional accuracy resulting from the higher track density on the storage disks, will require seek times of approximately 6 msec.

Referring to FIG. 2, a model of the hard disk drive unit plant expressed in terms of Laplace transform variables is shown. A difference amplifier 20 has voltage drive signal applied to a first input terminal and a signal from the back-emf component 201 applied to a second input terminal. The output of difference amplifier 20 is amplified to first input terminal of difference amplifier 21 while an output signal from actuator resistance component 202 is applied to the second input terminal of difference amplifier 21. The output signal from difference amplifier 21 is applied to the actuator impedance component 22. The output signal from the output impedance component 22 is applied to 1/s analog component 23. The output signal from the 1/s analog component 23 is applied to the actuator resistance filter 202 and to the actuator torque/inertia component 24. The output signal from the actuator torque/inertia component 24 is applied to a first input terminal of difference amplifier 25, while an output signal from coulomb friction analog unit 29 is applied to a second input terminal of difference amplifier 25. The output signal of difference amplifier 25 is applied to resonance analog unit 26. The output signal from the resonance analog unit 26 is applied to 1/s analog component 27. The output signal for 1/s analog component 27 is applied to an input terminal of back-emf component 201, to and input terminal of coulomb friction analog component 29, and to an input terminal of 1/s analog component 28. The output signal from 1/s analog component 28 is indicative of the position of the read/write head. The major components of the plant model of FIG. 2 represent the rotary actuator (dc torque) characteristics, the head and actuator inertia, the mechanical resonance of the plant, and the mechanism friction. The model includes a non-linear representation, i.e., the saturation of the power supply at its limits (±12 volts), mechanism resonance, and friction on the seek time performance. Typical values for the parameters of the actuator plant unit are: the actuator resistance R=8.0 ohms, the actuator inductance L =1.0 mH, the actuator torque constant $K_t$=13 oz-in/amp, the back-emf constant $K_b$=0.092 v-sec/rad, and the actuator inertia J=0.0009 oz-in-sec$^2$.

Referring once again to FIG. 2, the transfer function for input voltage to output velocity (neglecting mechanism resonance and friction can be described by the Laplace equation:

$$\omega(s)/V(s)=(1/K_b)/\{1+JRs/K_bK_t\}\{1+Ls/R\} \quad (1)$$

Assuming that $JR/K_bK_t>>L/R$, an assumption normally interpreted that the mechanical time constant is much greater than the electrical time constant and generally true for hard disk drive actuators, this equation can be reduced to a second order differential equation;

$$d^2\theta/dt^2+d\theta/dt(1/\tau_m)=\pm V/(K_b\tau_m) \quad (2)$$

where $\pm V$ is the variable power supply voltage and $\tau_m$=JR/$(K_bK_t)$, the mechanical time constant. The term $\pm V/(K_b\tau_m)$ is the (sign dependent) acceleration or deceleration capability of the plant and can be defined as $\pm A$. To accelerate the actuator head, +A would be applied and the time dependence of the state equation becomes:

position $\theta=\tau_m At-\tau_m^2 A(1-e^{t/\tau m})$ velocity (delta) $d\theta/dt=\tau_m A(1-e^{t/\tau m})$ acceleration $d^2\theta/dt^2=Ae^{t/\tau m}$)

Similarly, when the actuator is decelerating, i.e., −A is applied to the plant, then the solution for the differential equation would be position $\theta=\{\tau_m(d\theta/dt)_{sw}+\tau_m^2 A\}(1-e^{t/\tau m})-\tau_m At+\theta_{sw}$ velocity (delta) $d\theta/dt=(d\theta/dt)_{sw}e^{t/\tau m}-\tau_m A(1-e^{t/\tau m})$ deceleration $d^2\theta/dt^2=-\{A+(d\theta/dt)_{sw}/\tau_m\}e^{t/\tau m}$ where $\theta_{sw}$ and $(d\theta/dt)_{sw}$ are states (initial conditions) at the time of the application of the −A force.

A simple definition of a controller objective is movement of the actuator read/write head from an initial state ($\theta=\theta_i$, $d\theta/dt=0$, and $d^2\theta/dt^2=0$) to a final state ($\theta=\theta_f$, $d\theta/dt=0$, and $d^2\theta/dt^2=0$) in the minimum time. The optimum control procedure to accomplish this minimum seek time movement requires N−1 drive signal polarity reversals for a system described by an $N^{th}$ order state equation. Therefore, with the second order system described by the above equations, the minimum seek time will be accomplished with one polarity reversal from +V to −V at some point during the transition from the initial to the final state. The steps to accomplish this minimum time movement can be summarized as follows:

1) Apply full power supply voltage to the actuator to accelerate from some initial state $\theta_i$ to a switch point $\theta_{sw}$.
2) Apply full reverse power supply voltage to the actuator to decelerate from the switch point $\theta_{sw}$ to the desired final state $\theta_f$.
3) At $\theta=\theta_f$, initiate track control, with $d\theta/dt=0$ and $d^2\theta/dt^2=0$ if $\theta_{sw}$ is chosen correctly.

FIG. 3 illustrates a computer simulation of an example of a seek operation for a movement of 0.122 radians. In this simulation, a maximum voltage of +12 volts is applied to the plant. As a result, the velocity of the actuator head accelerates to 50 radians/sec and the position error decreases to slightly greater than 50 milliradians (mrad) at a time of approximately 3 msec. At this time, the decision is made to reverse the voltage to the maximum negative value of −12 volts. The actuator decelerates to zero position error and zero velocity in less than 6 msec.

The minimum seek time illustrated by FIG. 3 relies on the fact that the optimum switch point, $\theta_{sw}$, is properly determined. If a controller can be designed which achieves the foregoing sequence for applying the maximum available voltage with the correct timing sequence for any arbitrarily-sized seek operation, then the controller achieves the minimum seek time for the hard disk drive unit. Furthermore, when the controller can accomplish this desired sequence in the presence of expected plant non-linearity and in the presence of parameters which can vary with time and with temperature, then the controller has wide-spread applicability and utility.

A need has been therefore been felt for apparatus and an associated technique which will approximate a minimum time for a seek operation in a hard disk controller in the presence of non-linearity of the actuator unit and in the presence of time-varying and temperature dependent parameters.

SUMMARY OF THE INVENTION

The aforementioned and other features are accomplished, according to the present invention by including a fuzzy logic rule-based algorithm in the feedback loop of the hard disk drive read/write head controller unit for the seek mode of operation and a fuzzy logic rule based algorithm for the track mode of operation. In the seek mode of operation, the component in which the fuzzy logic rule-based algorithm is resident receives signals representative of the present position (relative to the destination position) and the present velocity based on these parameters determines the required acceleration. From the acceleration and the present position, a desired velocity, $V_d$, is determined. The signal representing the desired velocity is compared with a signal representing present velocity and command signal is applied to the actuator. In this manner, a seek time can be provided which meets the requirements of proposed hard disk drives. The track function is also performed using a fuzzy logic rule-based system. The output signal from the seek apparatus or from the track apparatus is selected based on read/write head position and velocity parameters.

These and other features of the present invention will be understood upon the reading of the following description in conjunction with the Figures.

DESCRIPTION OF THE PREFERRED EMBODIMENT(S)

1. Detailed Description of the Drawings

Figure 1:
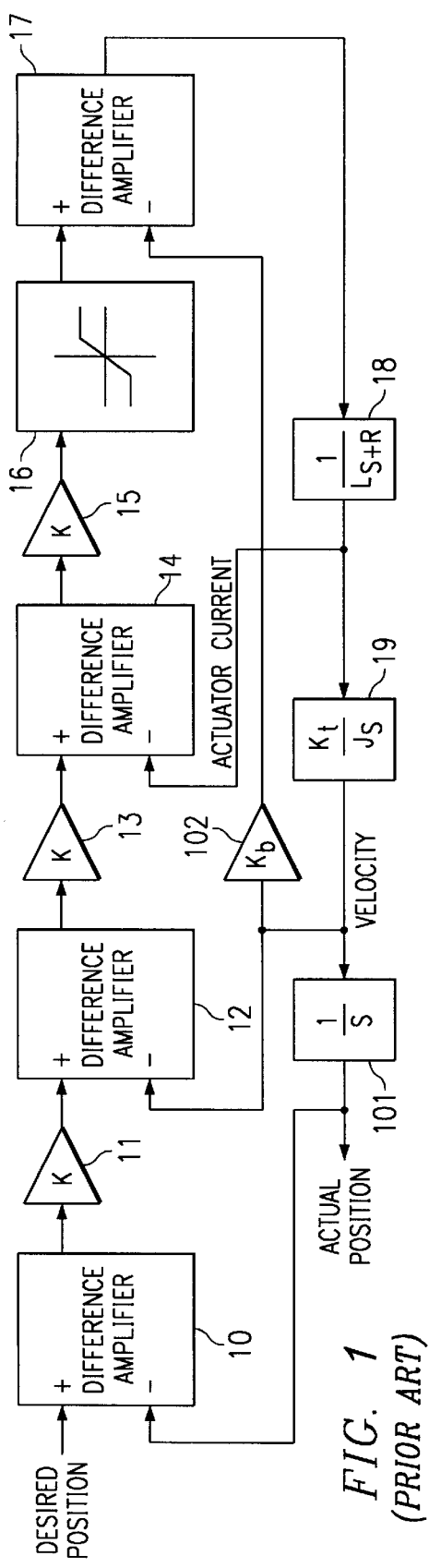
FIG. 1 is a block diagram of a hard disk drive control apparatus according to the prior art.
Figure 2:
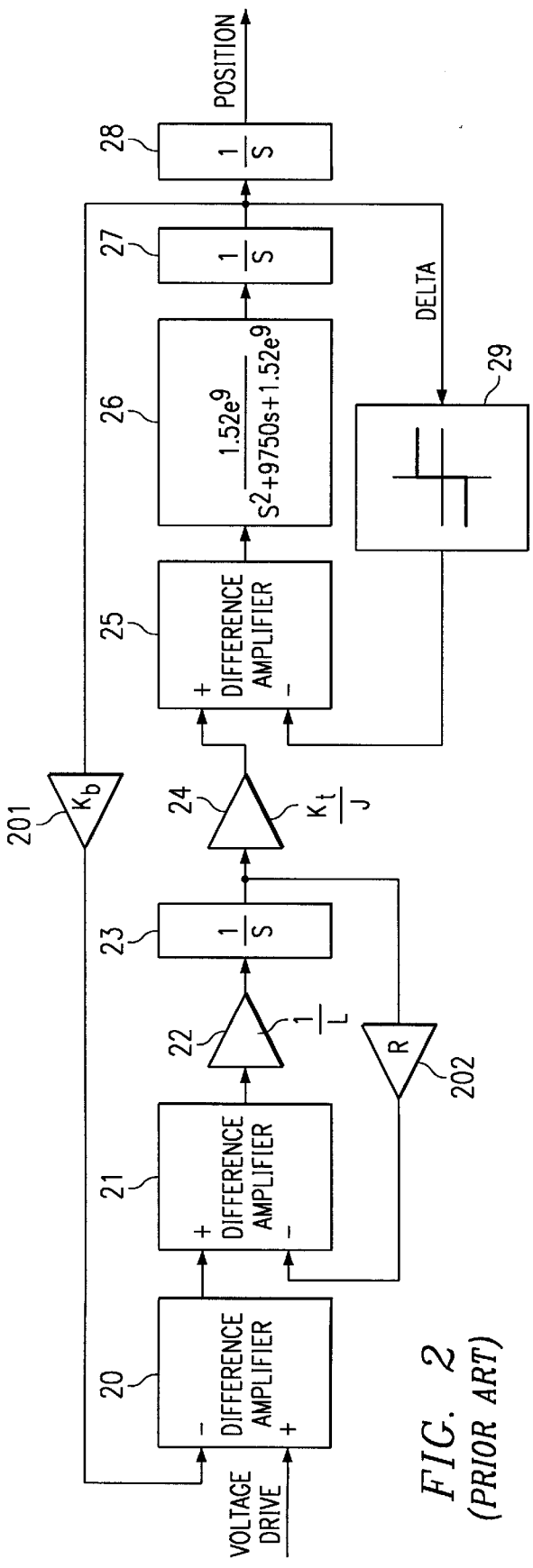
FIG. 2 is a mathematical representation of the hard disk drive actuator or plant according to the prior art.
Figure 3A:
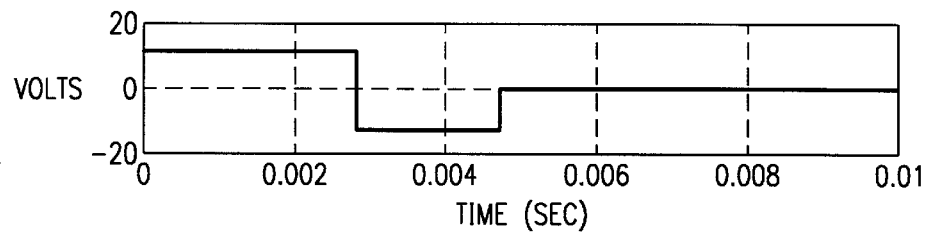
FIGS. 3A–3C are computer simulation of a minimum seek time operation for the disk drive actuator of FIG. 2.
Figure 3B:
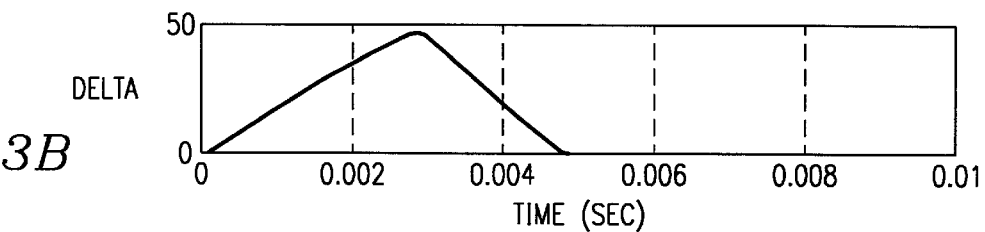
Figure 3C:
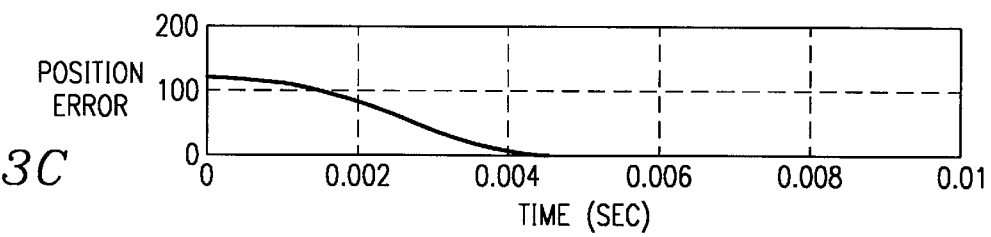

FIG. 1, FIG. 2 and FIG. 3 have been discussed with respect to the prior art.

Figure 4:
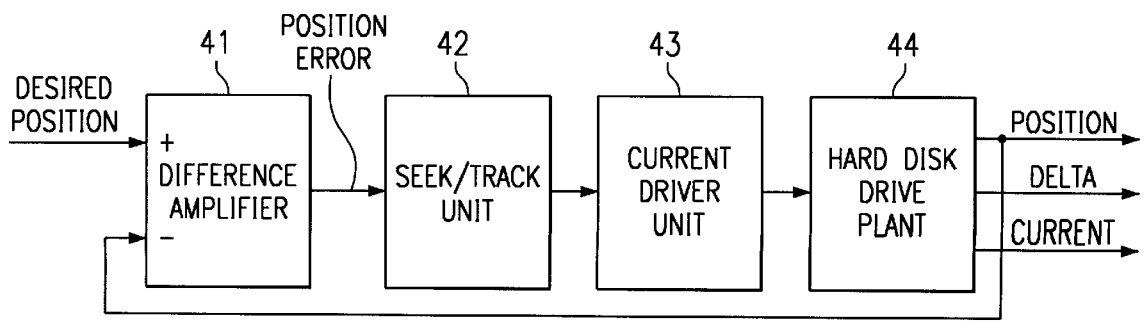
FIG. 4 is an overall system diagram of a fuzzy rule controller for a hard disk drive unit according to the present invention.

Referring next to FIG. 4, a block diagram is shown of the major components implementing the hard disk drive seek/track function using a closed loop controller based on the fuzzy logic rule set. Block 44 includes the hard disk drive plant (actuator and mechanical arm) with all of the associated parameters of the actuator electrical and mechanical time constants as well as the parameters of mechanical resonance and the (non-linear) friction represented. Block 44 provides output signals for POSITION, VELOCITY and CURRENT. The POSITION signal is fed back to the one input terminal of block (difference amplifier) 41, the second input terminal of difference amplifier having the desired position applied thereto. The output signal of block 41, representing the position error, is applied to an input terminal of block 42. Block 42 represents the fuzzy rule-based controller which, based on the position error signal and derivatives thereof, applies a voltage output signal to a first input terminal of block 43. Block 43 represents a high bandwidth current driver unit. The CURRENT signal from block 44 is applied to a second input terminal of block 43. Block 43 applies current to the actuator element of block 44 minimizing the impact of the actuator time constant within the linear range of the available power supply.

Figure 5:
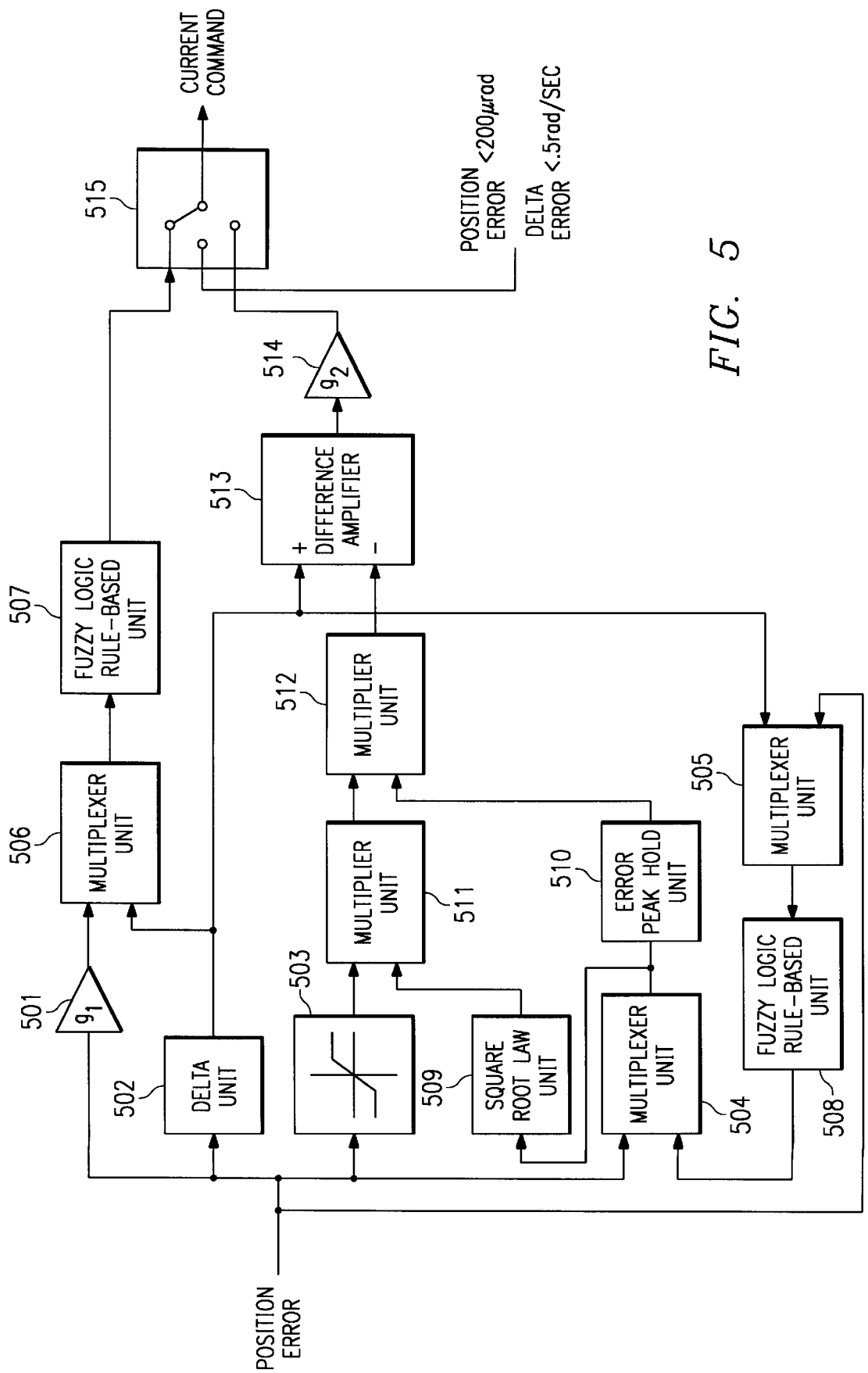
FIG. 5 is an implementation of the seek/track control unit for a hard disk drive controller according to the present invention.

Referring next to FIG. 5, a block diagram of the fuzzy rule-based seek/track controller, according to the present invention, is shown. Components 501, 502, 506 and 507 provide the track control function, while the remainder of the components and component 502 provide the seek control function. Switch 515 selects the track mode signal, i.e., from component 507 when the position error is less than 200 uradians and the delta error is less than 0.5 radians/sec. Otherwise, switch 515 selects the seek mode signal, i.e., the output signal of amplifier 514. The output signal of switch 515 is the current command. For the track mode of operation, the POSITION ERROR signal is applied to an input terminal of delta position unit 502 and to amplifier 501. The output signals from amplifier 501 and from delta position unit 502 are applied through multiplexer 506 to the track fuzzy-logic rule-based unit 507. The output signal from the track fuzzy logic rule-based unit 507 is applied to a first input terminal of switch 515. With respect to the seek mode of operation, the POSITION ERROR signal is applied to delta position unit 502, to sign unit 503, to a first input terminal of multiplexer unit 504, and to a first input terminal of multiplexer unit 505. The output signal from delta position unit 502 is applied to a first terminal of difference amplifier 513 and to a second input terminal of multiplexer unit 505. The output signal from multiplexer unit 505 is applied to fuzzy logic rule-based unit 508. The output signal from fuzzy logic rule based unit 508 is applied to a second input terminal of multiplexer unit 504. The output signal from multiplexer unit 504 is applied to error peak hold unit 510 and square root law unit 509. The output signal of sign unit 503 and the output signal from square root law unit 509 are applied to multiplier unit 511. The output signal from multiplier unit 511 and the output signal from error peak hold unit 510 are applied to multiplier unit 512. The output signal from multiplier unit 512 is applied to a second input terminal of difference amplifier 513. The output signal from difference amplifier 513 is applied through amplifier unit 514 to a second input terminal of switch 515.

Figure 6A:
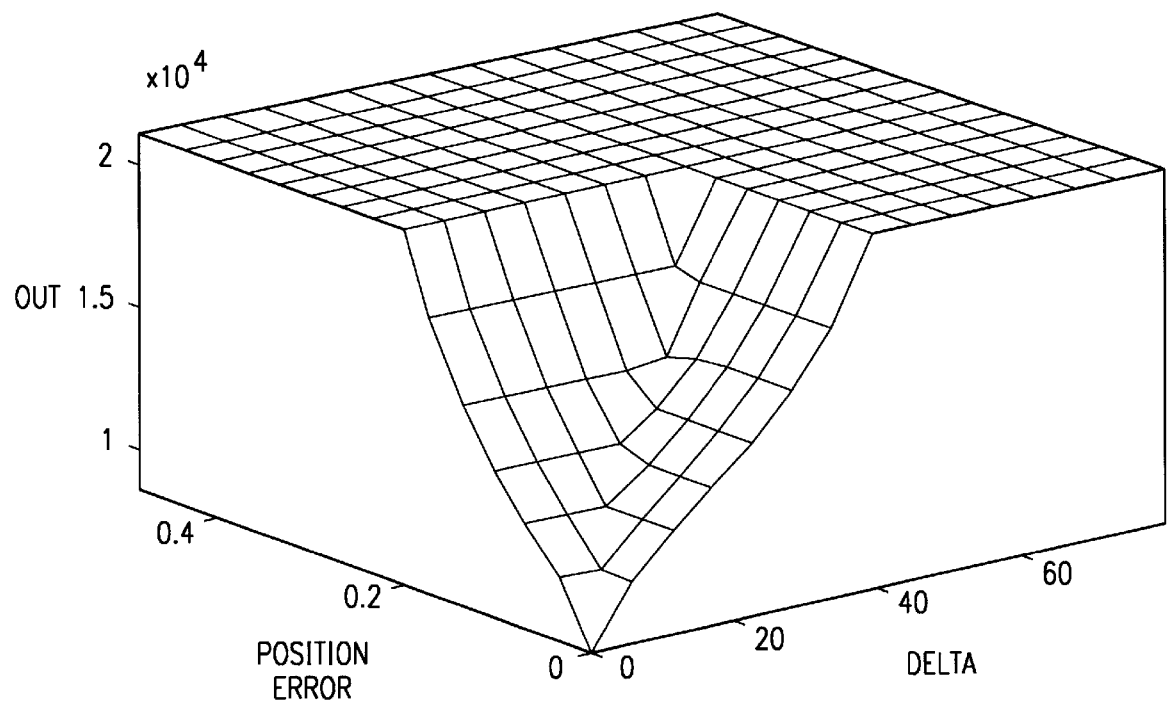
FIG. 6A is an output surface plot of the fuzzy rule, seek function algorithm for a hard disk drive unit according to the present invention.
Figure 6B:
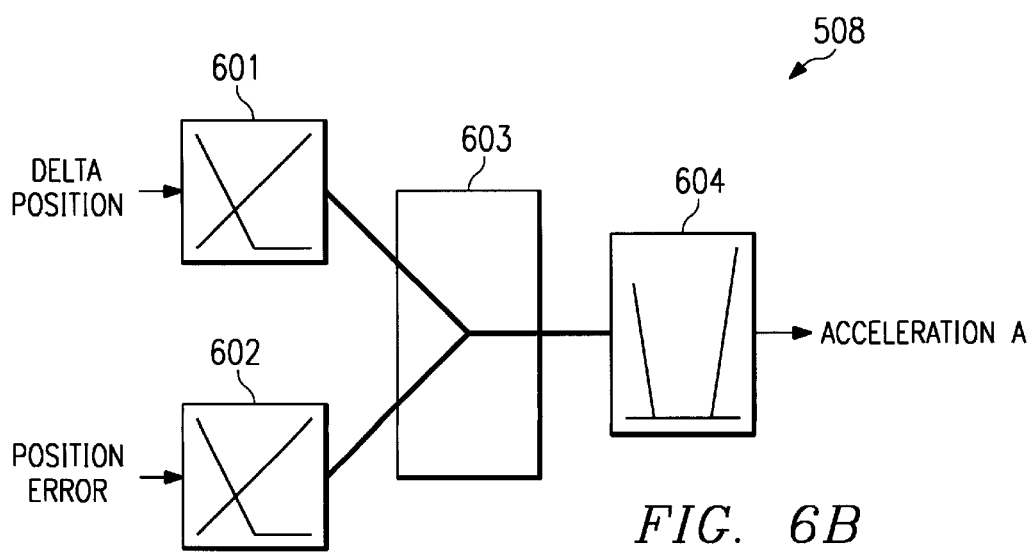
FIG. 6B illustrates the organization of the block 508.
Figure 6C:
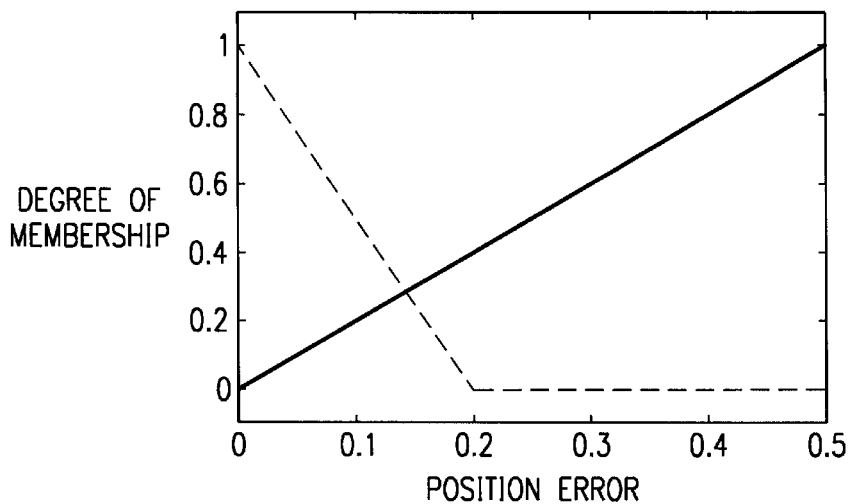
FIG. 6C is the membership function for the position error.
Figure 6D:
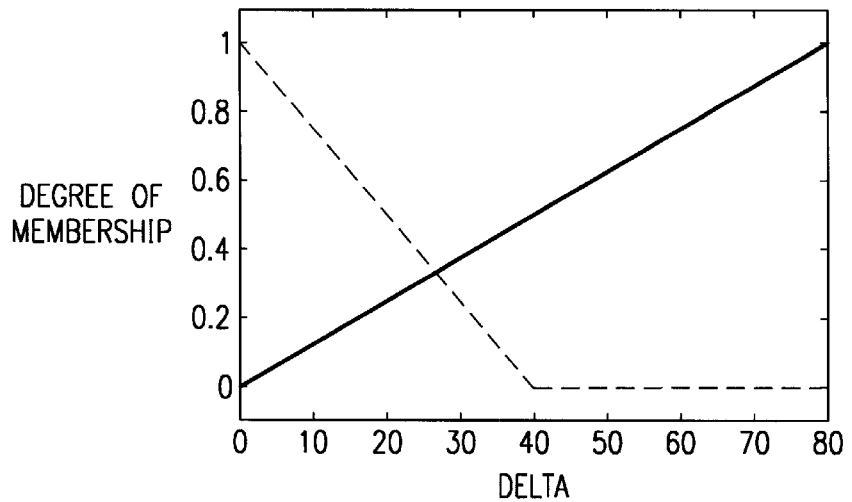
FIG. 6D is the membership function for the delta position.
Figure 6E:
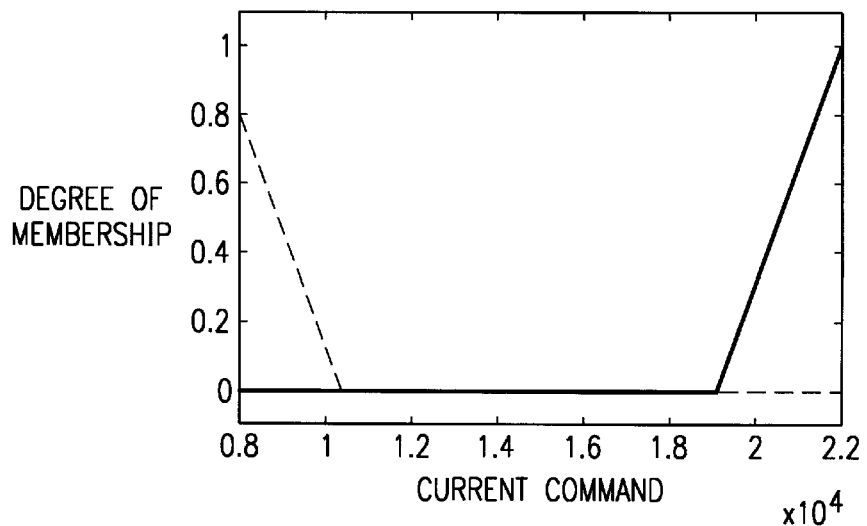
FIG. 6E is the membership function for output A.

Referring to FIG. 6A, an output signal surface plot of the fuzzy rule, seek function algorithm for a hard disk drive unit, according to the present invention, is shown. This seek function implements a variation of the commonly used square root law, whereby the acceleration term A of the formula $V_d=(2A\epsilon)^{1/2}$. However, in the present invention, the acceleration A is not held constant as is true in the prior art. The acceleration term is varied as a function of position error and delta position through the component 508 (i.e., shown in FIG. 5). The functional operation of component 508 is shown in FIG. 6B. The input signals to component 508 are the position error signal, applied to position membership function component 601 and the delta position signal, applied to delta position membership function component 610. The membership function for the component 601 is shown in FIG. 6C, while the membership function for component 602 is shown in FIG. 6D. The output signals from components 601 and 602 are applied to and combined in component 603. Using the membership rules illustrated by FIG. 6E, the acceleration signal A' is generated by membership function component 604. Applying Rules 1–4 shown in Table I to the input membership functions and using the fuzzy Mamdani operation through the output membership function shown in FIG. 6E, the output signal for an acceleration term A' is generated as shown in FIG. 6A.

Figure 7A:
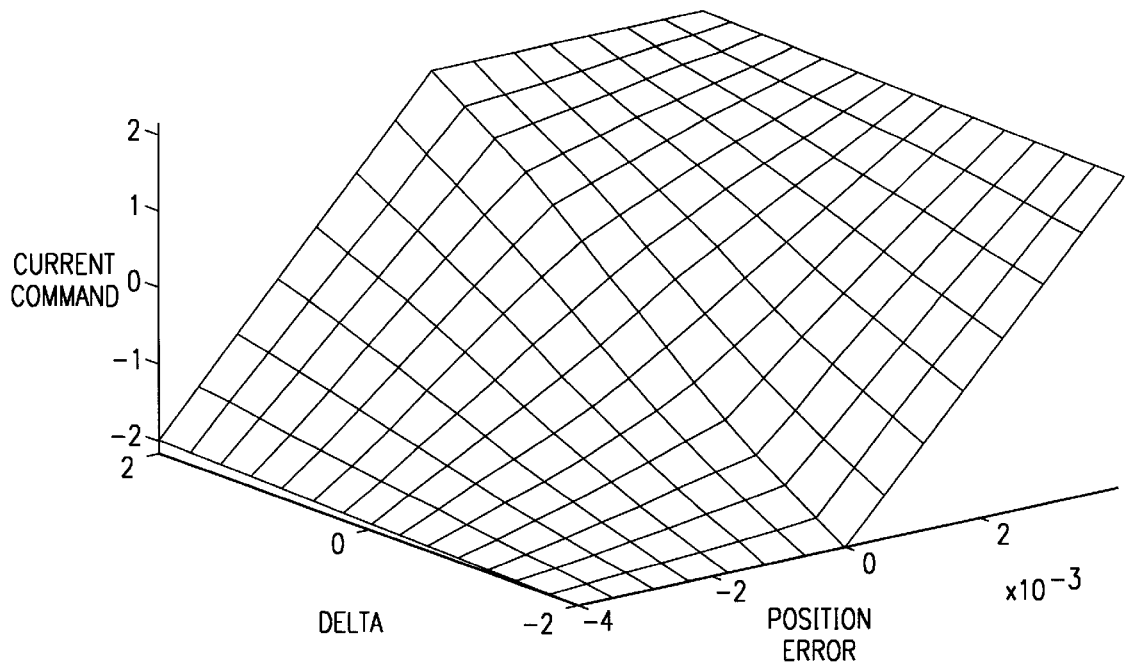
FIG. 7A is an output surface plot of the fuzzy rule, track function algorithm for a hard disk drive unit according to the present invention.

Referring to FIG. 7A, an output surface plot of the fuzzy rule, track function algorithm for the track function of a hard disk drive unit, according to the present invention, is shown.

Rule 1: When the delta position is big and the position error is small, then the output is big.

Rule 2. When the delta position is small and the position error is small, then the output is small.

Rule 3. When the delta position is big and the position error is big, the output is big.

Rule 4. When the delta position is small and the position error is big, then the output is big.

Table I

Figure 7B:
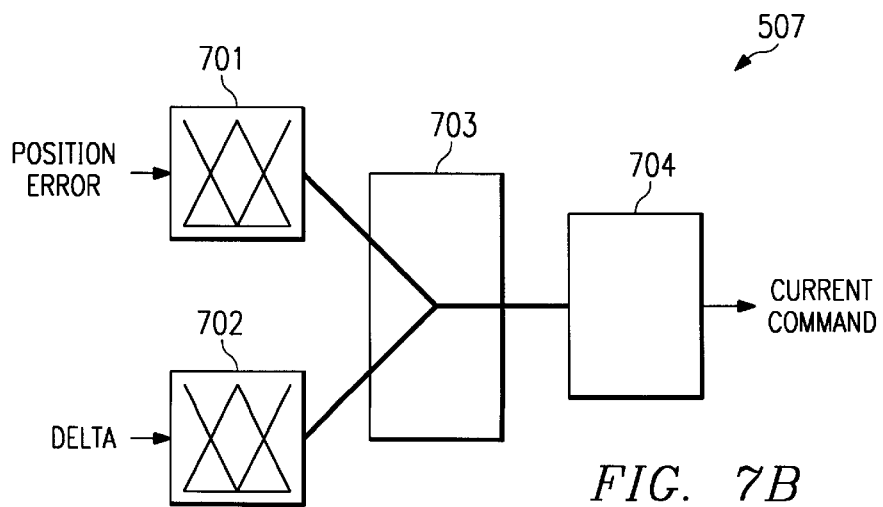
FIG. 7B illustrates the organization of the component 507.

This surface plot is generated in component 507. The functionality of component 507 is illustrated by FIG. 7B.

Figure 7C:
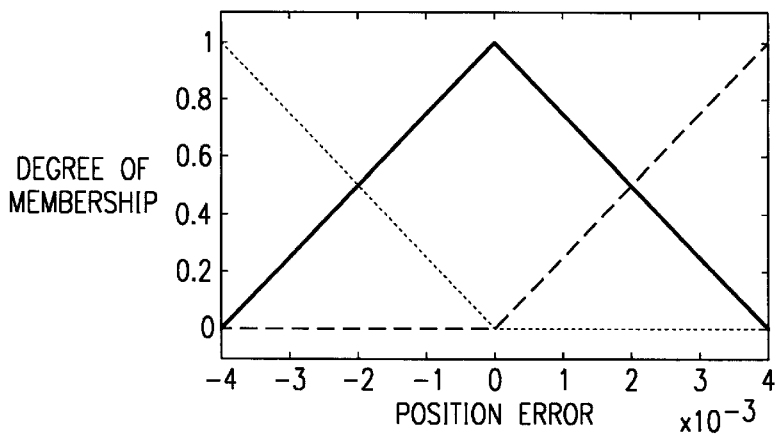
FIG. 7C illustrates the fuzzy logic, membership rules for the position error parameter.
Figure 7D:
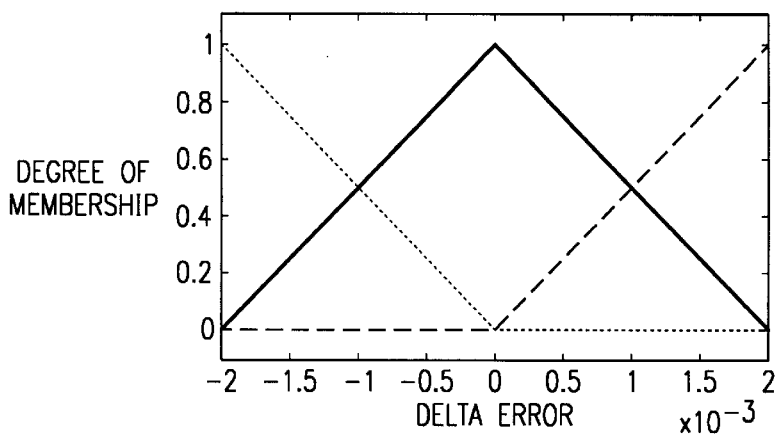
FIG. 7D illustrates the fuzzy logic, membership rules for the delta position.

The position error signal is applied to the position error fuzzy logic membership component 701. The membership curve for the position error signal is shown in FIG. 7C. The delta position signal is applied to delta position fuzzy logic component 702. The delta position membership functionality is shown in FIG. 7D. The resulting signals are combined in component 703 using the Sugeno-style fuzzy interference singleton membership function for the output signal and will result in the CURRENT COMMAND OUTPUT SIGNAL as generated with the profile shown in FIG. 7A.

Figure 8A:
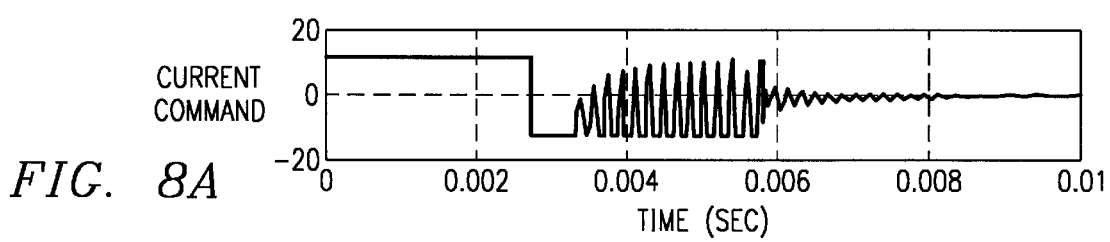
FIGS. 8A–8C are computer simulation of the minimum seek time of a hard disk drive unit according to the present invention.
Figure 8B:
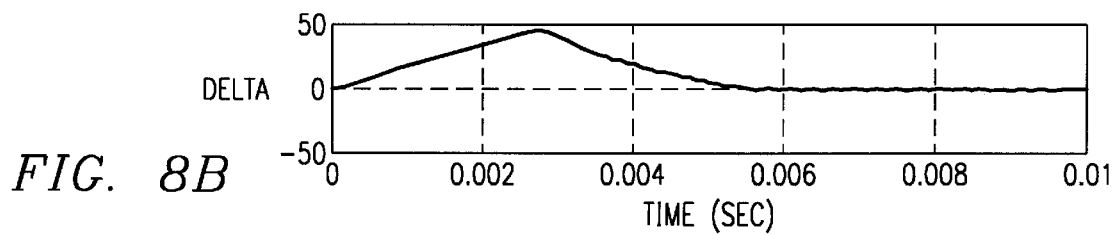
Figure 8C:
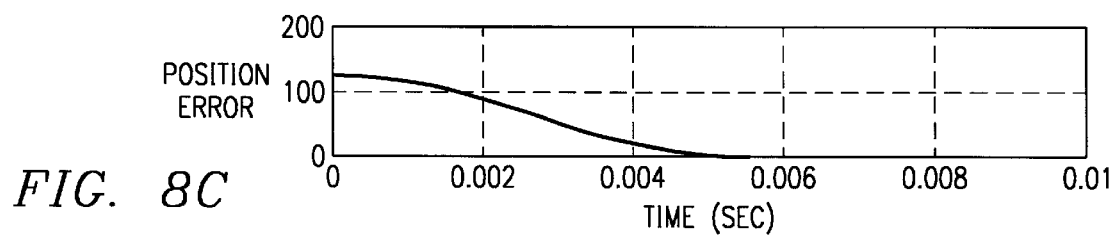
Figure 9A:
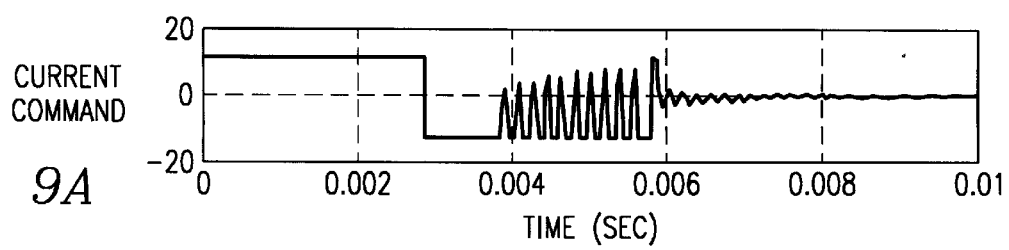
FIGS. 9A–9C are computer simulation of an average seek time of a hard disk drive when $K_t$ is approximately 10% less than the nominal value according to the present invention.
Figure 9B:
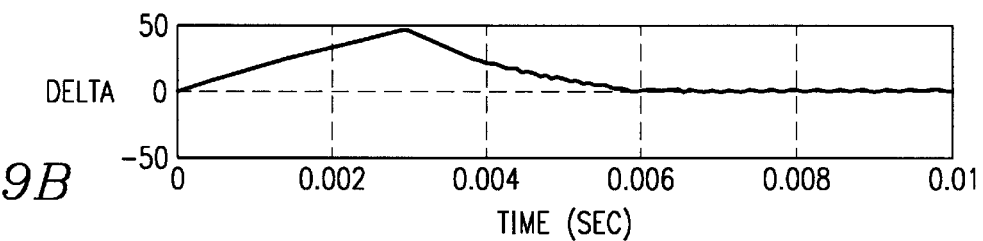
Figure 9C:
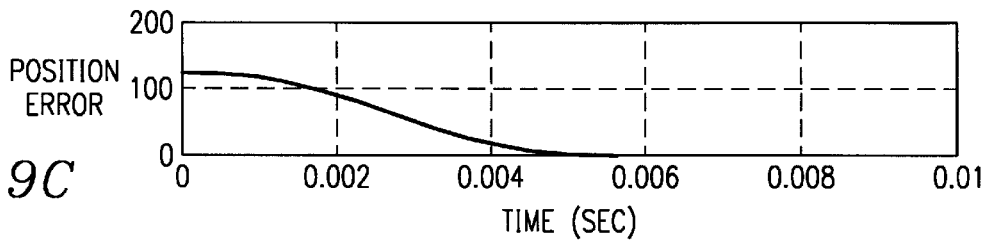
Figure 9C:

Referring to FIG. 8, a computer simulation of the minimum seek time of a hard disk drive unit, according to the present invention, is shown. This computer simulation was performed for the condition that the average desired seek movement is 0.122 radians.

Rule 1: When the error is negative big and the delta position error is positive big, then the output is negative big.
Rule 2: When the error is negative big and the delta error is zero, then the output is negative big.
Rule 3: When the error is zero and the delta error zero, then the output is zero.
Rule 4: When the error is positive big and the delta error is zero, then the output is positive big.
Rule 5: When the error is positive big and the delta error is negative big, then the output is positive big.
Rule 6: When the error is zero and the delta error is positive big, then the output is positive big.
Rule 7: When the error is positive big and the delta error is positive big, then the output is positive big.
Rule 8: When the error is negative big and the delta error is negative big, then the output is negative big.
Rule 9: When the error is zero and the delta error is negative big, then the output is negative big.

Table II

Figure 10A:
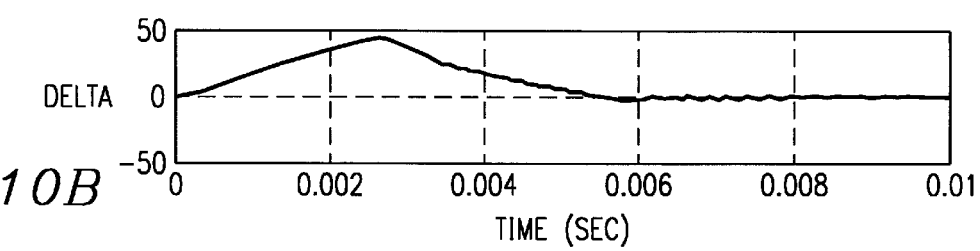
FIGS. 10A–10C are computer simulation of an average seek time of a hard disk drive when $K_t$ is approximately 10% greater than the nominal value according to the present invention.
Figure 10B:
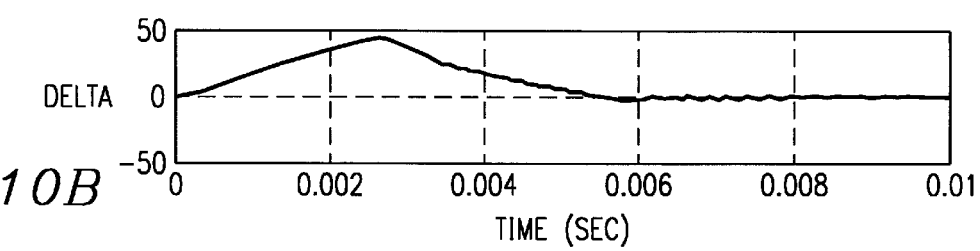
Figure 10C:

Referring to FIG. 9 and FIG. 10, a computer simulation of an average seek time of a hard disk drive when torque constant, $K_t$, is varied from the nominal value, according to the present invention, is shown. In FIG. 9, the torque constant, $K_t$, is 10% less than the nominal value, while in FIG. 10, the torque constant, $K_t$, is 10% greater than the nominal value.

Figure 11A:
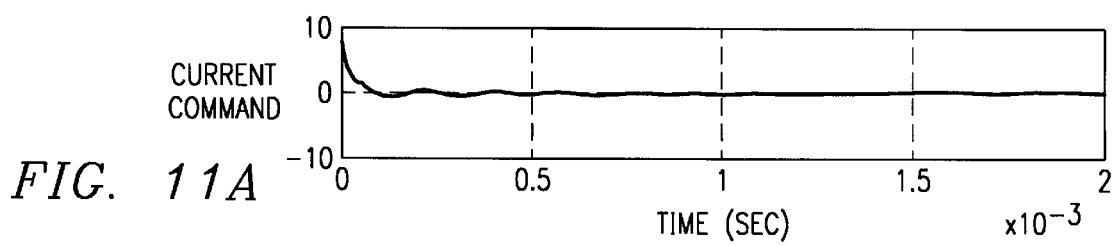
FIGS. 11A–11C are computer simulation of a seek time of a hard disk drive for a minimum seek length according to the present invention.
Figure 11B:
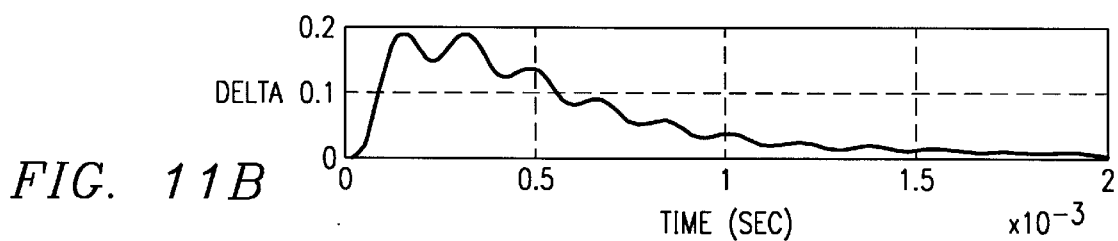
Figure 11C:
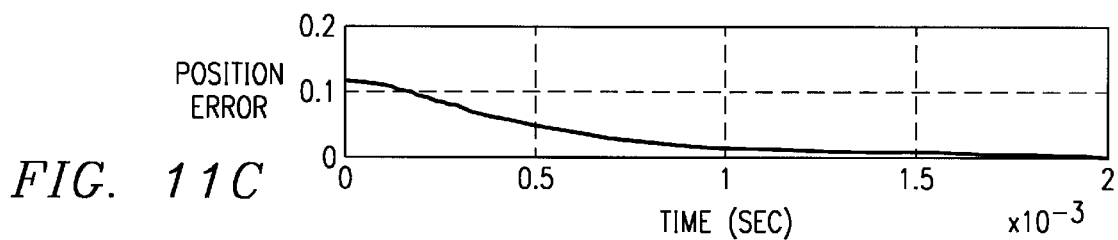
Figure 12A:
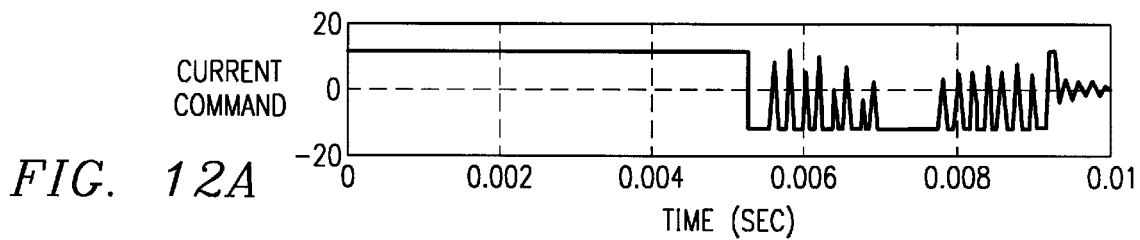
FIGS. 12A–12C are computer simulation of a seek time of a hard disk drive with a maximum seek length according to the present invention.
Figure 12B:
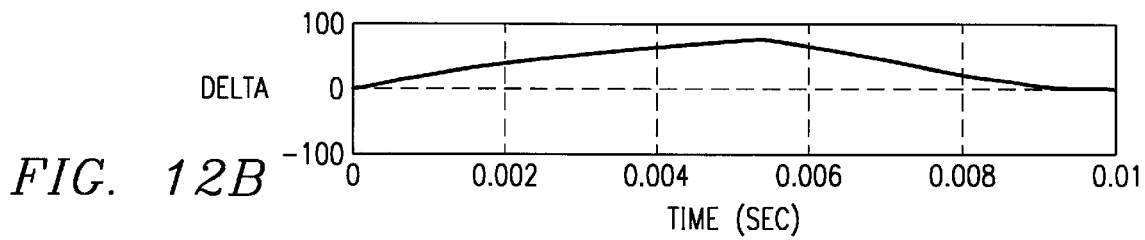
Figure 12C:
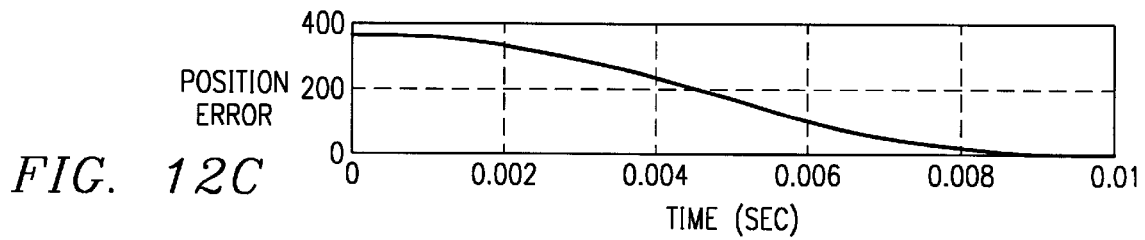

Referring to FIG. 11 and FIG. 12, computer simulations of a seek time of a hard disk drive for a minimum seek length and a maximum seek length, according to the present invention, are shown. In FIG. 11, the minimum seek length of 111 urad is used in the simulation, while in FIG. 12, the maximum seek length of 0.365 radians is used in the simulation.

2. Operation of the Preferred Embodiment(s)

The goal of the hard disk drive controller is to generate voltage drive commands energizing the hard disk drive plant in a manner which closely approximates the voltage waveform illustrated in FIG. 3 for a minimum seek time. The inventive plant control unit combines a seek algorithm and a track algorithm using fuzzy rule based logic to achieve the desired voltage waveform at the plant input. As is illustrated in FIG. 5, when the position error is greater than 200 urad and the delta position is greater than 0.5 rad/sec, then the seek algorithm controls the voltage input. When the position error and the delta position decrease to below 200 urad and 0.5 rad/sec respectively, the track algorithm controls the application of the voltage to the plant. The requirement that the controller provide minimum seek times for all seek lengths, from a one track seek length to thousands of tracks seek length, leads to the well-known square root law which generates a velocity trajectory based upon constant acceleration.

$$V_d = (2A\epsilon)^{1/2}$$

where $V_d$ is the desired velocity, A is the available acceleration, and $\epsilon$ is the position error, i.e., relative to the desired track position. In prior art controllers, the use of the square root law requires a precision velocity loop of high bandwidth to closely follow the desired velocity (delta) trajectory and maintain constant acceleration/deceleration. Constant current control requires that the current control loop not saturate. Consequently, the maximum supply voltage cannot be applied to the plant under initial accelerate or decelerate conditions in order to maintain constant current (acceleration) at higher velocities. Thus, in the prior art controller, the direct application of the square root law can not result in a minimum seek time.

The hard disk drive plant control unit herein disclosed overcomes these limitations through the application of a fuzzy logic rule-based algorithm which modifies the square root law to provide maximum acceleration available as a function of the position error and the rate of change of position error (i.e., the delta position). The fuzzy logic rule-based algorithm is illustrated in FIG. 6A as a three dimensional plot of the output surface representing the acceleration (OUT) as a function of position error (PER) and delta position (VEL). The output of the square root law algorithm component 509, $(2A\epsilon)^{1/2}$, is provided with the correct sign by being multiplied, in multiplier unit 511, with the output from sign unit 503. The output signal of multiplier unit 512 is compared with output signal of delta position unit 502 through a high gain in multiplier unit 514 to achieve a minimum seek time. The difference amplifier 513 forms a velocity summing junction which compares the desired velocity, $V_d$, as generated by block 512 during the seek operation to the delta position signal from component 502. Component 512 multiplies $(2A\epsilon)^{1/2}$ by the output of component 510. Component 510 detects and holds the peak position error $\epsilon_{pk}$ at the start of the seek operation therefore actually modifying the velocity command further, the desired velocity thereby becoming $V_d = (2A\epsilon)^{1/2} * \epsilon_{pk}$.

As the position error and the delta position transition through 200 urad and 0.5 rad/sec, respectively, control of the plant is transferred to the fuzzy rule track algorithm unit 507. The three-dimensional surface plot of the fuzzy rule track algorithm is shown in FIG. 7.

The operation of the fuzzy rule controller, is indicated by computer simulations as shown in FIGS. 8–12. FIG. 8 illustrates the minimum seek time operation of the present invention for an average seek length. FIGS. 9 and 10 illustrate the operation of the fuzzy rule controller when one of the parameters, the torque constant $K_t$, deviates from the nominal design value by ±10%, respectively, for an average seek length. FIGS. 11 and 12 illustrate the operation of the present invention for a minimum and a maximum seek length. In each case, with the exception of the maximum seek length, the seek time is within the 6 msec requirement for the high density hard disk drives. For the maximum seek length, the seek time is approximately 8 msec. FIGS. 9 and 10 emphasize the fact that controller of the present invention is relatively insensitive to parameter changes.

While the invention has been described with particular reference to the preferred embodiment, it will be understood by those skilled in the art that various changes may be made and equivalents substituted for elements of the preferred embodiment without departing from the invention. In addition, many modifications may be made to adapt a particular situation and material to a teaching of the present invention without departing from the essential teachings of the present invention.

As is evident from the foregoing discussion, certain aspects of the invention are not limited to the particular details of the examples illustrated, and it is therefore contemplated that other modifications and applications will occur to those skilled in the art. It is accordingly intended that the claims shall cover all modifications and applications as do not depart from the spirit and scope of the invention.

What is claimed is:

1. A method of controlling the position of a read/write head in a hard disk drive unit, said method comprising the steps of:

based on a fuzzy logic rule-based algorithm, generating a desired delta signal for a seek mode of operation in response to a current relative position signal and a current delta signal;

comparing said desired delta signal and said current delta signal;

based on said comparing step, generating a seek mode activation signal;

based on a second fuzzy logic rule-based algorithm, generating a track mode activation signal for a track mode of operation in response to said current relative position signal;

selecting said seek mode activation signal or said track mode activation signal based on said current position signal and said delta signal; and generating a drive current responsive to the selected signal and applying this drive current to an actuator, to move the read/write head toward a desired position.

2. The method of claim 1 wherein said generating said desired delta signal step includes the steps of:

determining an acceleration value from said fuzzy logic algorithm; and based on said acceleration value, generating said desired delta signal.

3. The method of claim 2 wherein said generating said desired delta signal based on said acceleration value includes the step of determining said desired delta value from $(2A\epsilon)^{1/2}$, wherein A is said acceleration value and E is said relative position value.

4. A hard disk drive system, comprising:

an actuator;

a mechanical arm controlled by the actuator;

a read/write head coupled to the mechanical arm;

a controller, comprising:
     a first feedback unit for use in a seek mode of operation, said first feedback unit including:
       a delta unit responsive to a position signal identifying a position of said read/write head for generating a delta signal;
       a first fuzzy logic rule-based unit responsive to said position signal and to said delta signal for providing an acceleration signal;
       a function unit responsive to said acceleration signal and to said position signal for generating a desired delta signal; and
       a comparison unit responsive to said desired delta signal and to said delta signal for generating a first feedback unit activation signal determined thereby, said activation signal being applied to said actuator;
     a second feedback unit responsive to said position signal for use in a track mode of operation, said second feedback unit including a second fuzzy logic rule-based unit responsive to said position signal and to said delta signal for generating a second feedback unit activation signal; and
     a switch responsive to said position signal and to said delta signal for selecting a one of said first feedback unit activation signal or said second feedback unit activation signal; and a current driver, for driving the actuator responsive to the selected activation signal.

5. The hard disk drive system of claim 4 wherein said function unit determines said desired velocity from $(2A\epsilon)^{1/2}$, wherein A is said acceleration signal and $\epsilon$ is said position signal.

* * * * *